US009377651B2

(12) United States Patent
Gu et al.

(10) Patent No.: US 9,377,651 B2
(45) Date of Patent: Jun. 28, 2016

(54) CHOLESTERIC LIQUID DISPLAY AND METHOD FOR PREPARING THE SAME

(75) Inventors: Xin Gu, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 410 days.

(21) Appl. No.: 13/699,468

(22) PCT Filed: Aug. 1, 2012

(86) PCT No.: PCT/CN2012/079514
§ 371 (c)(1),
(2), (4) Date: Nov. 21, 2012

(87) PCT Pub. No.: WO2013/017084
PCT Pub. Date: Feb. 7, 2013

(65) Prior Publication Data
US 2013/0208220 A1    Aug. 15, 2013

(30) Foreign Application Priority Data
Aug. 2, 2011 (CN) .......................... 2011 1 0219554

(51) Int. Cl.
*G02F 1/1335* (2006.01)
*C09K 19/58* (2006.01)
*G02F 1/137* (2006.01)
(Continued)

(52) U.S. Cl.
CPC ........ *G02F 1/133553* (2013.01); *C09K 19/588* (2013.01); *G02F 1/13476* (2013.01); *G02F 1/13718* (2013.01); *C09K 19/3405* (2013.01); *C09K 2019/123* (2013.01)

(58) Field of Classification Search
CPC .......... G02F 1/133553; G02F 1/13718; G02F 1/13476; C09K 19/588; C09K 19/3405; C09K 2019/123
USPC ................................... 349/106, 115
See application file for complete search history.

(56) References Cited

U.S. PATENT DOCUMENTS 6,377,321 B1    4/2002  Khan et al.
2001/0055089 A1 * 12/2001  Van De Witte et al. ....... 349/185
(Continued)

FOREIGN PATENT DOCUMENTS

CN           1388911 A      1/2003
CN           1470912 A      1/2004
(Continued)

OTHER PUBLICATIONS

First Chinese Office Action dated Jan. 23, 2014; Appln. No. 201110219554.7.
(Continued)

*Primary Examiner* — Nathanael R Briggs
(74) *Attorney, Agent, or Firm* — Ladas & Parry LLP

(57) ABSTRACT

Embodiments of the invention comprise a cholesteric liquid display and a method for preparing the same. The cholesteric liquid display comprises a first substrate; an electrode substrate opposite to the first substrate; and a cholesteric liquid crystal layer between the first substrate and the electrode substrate, wherein the cholesteric liquid crystal layer comprises at least one layer of cholesteric liquid crystal, and the same layer of cholesteric liquid crystal has different pitches in different regions so as to be capable of reflecting light of different colors, respectively.

19 Claims, 3 Drawing Sheets

(51) Int. Cl.
*G02F 1/1347* (2006.01)
*C09K 19/34* (2006.01)
*C09K 19/12* (2006.01)

(56) References Cited

U.S. PATENT DOCUMENTS

| | | | |
|---|---|---|---|
| 2004/0008301 A1* | 1/2004 | Yoon | 349/115 |
| 2004/0008302 A1 | 1/2004 | Moon | |
| 2007/0242175 A1 | 10/2007 | Chung | |
| 2011/0043716 A1* | 2/2011 | Hiji et al. | 349/25 |
| 2011/0157538 A1 | 6/2011 | Lee | |
| 2011/0181803 A1 | 7/2011 | Inoh | |
| 2012/0081644 A1* | 4/2012 | Jang et al. | 349/108 |

FOREIGN PATENT DOCUMENTS

| CN | 1479141 A | 3/2004 |
|---|---|---|
| CN | 102109716 A | 6/2011 |

OTHER PUBLICATIONS

International Preliminary Report on Patentability dated Feb. 4, 2014; PCT/CN2012/079514.

Second Chinese Office Action dated Jun. 4, 2014; Appln. No. 201110219554.7.

Dirk J. Broer, et al; "In-situ photopolymerization of oriented liquid-crystalline acrylates, $3^{a)}$", Makromol. Chem. vol. 190, Issue 9, pp. 2255-2268, Sep. 1989.

International Search Report; mailed Aug. 11, 2012; PCT/CN2012/079514.

Chinese Rejection Decision Appln. No. 201110219554.7; Dated Sep. 30, 2014.

Notification of Reexamination Appln. No. 201110219554.7; Dated Apr. 13, 2015.

\* cited by examiner

CHOLESTERIC LIQUID DISPLAY AND METHOD FOR PREPARING THE SAME

TECHNICAL FIELD

Embodiments of the invention relates to a cholesteric liquid display and a method for preparing the same.

BACKGROUND

In recent years, with the incessant improvement of the liquid display technique, liquid display products gradually enter into various fields of application. With advantages such as low energy consumption, flatness, light and thin structure, highly efficient display, energy saving, being environmentally friendly and the like, liquid crystal displays have taken a very significant role in the field of display.

With the incessant progress of the liquid display technique, the technique of cholesteric liquid crystal (CLC) display, which is novel, lighter and thinner, has low energy costs and portable, has been proposed. A cholesteric liquid display is characterized by high brightness of reflection, wide viewing angle, and low energy consumption, and enables display on a flexible substrate. A cholesteric liquid crystal display employs a reflective mode, and thus it is possible to omit a backlight and reduce the energy consumption and volume of an electric display device. Reflective cholesteric liquid displays can be widely used for occasions that require display but not frequent refreshing, such as e-books, e-curtains, price tags, outdoor advertisements, and the like.

CLC has drawn interest from many researchers due to its unique characteristics derived from its structure. The most important characteristics of CLC include its selective reflection property: circularly polarized light that shares the same optical direction as the helical axis of the CLC is reflected, while other light penetrates. For normal incoming light, the equation for the wavelength at the maximum selective reflectance is $\lambda_0 = \bar{n} \cdot p$, wherein $\bar{n}$ is an average reflection coefficiency, and p is a pitch. Although is an inherent property of a liquid crystal molecule, p varies along with temperature, electric field strength, magnetic field strength and the like. Therefore, it is possible to select the color of the reflected light by adjusting p. As early as 1989, Bmer et al. controlled the p of the cholesteric liquid crystal molecule through ultraviolet (UV) light sensitive materials (Bmer, J Boven, and GN Mol, Macromol Chem, 190, 2255 (1989)).

In the past ten plus years, it has been difficult to achieve full color display with a single layered CLC. The conventional method for full color display is to stack the single layered CLCs that each can reflect a single wavelength (such as red light, green light and blue light) (A. A. Khan, X.-Y. Huang, H. Yuan, M. Lu, and E. C. Urban, U.S. Pat. No. 6,377,321 (2002)). However, this will greatly increase costs and limit the practical use of the method.

SUMMARY

An embodiment of the invention provides a cholesteric liquid display that enables single layered full color display with low cost and a method for preparing the same.

An embodiment of the invention provides a cholesteric liquid display comprising a first substrate; an electrode substrate opposite to the first substrate; and a cholesteric liquid crystal layer between the first substrate and the electrode substrate, wherein the cholesteric liquid crystal layer comprises at least one layer of cholesteric liquid crystal, and the same layer of cholesteric liquid crystal has different pitches in different regions so as to be capable of reflecting light of different colors.

An embodiment of the invention also provides a method for preparing a cholesteric liquid display comprising steps of:

S1, doping an optically active chiral doping agent to a nematic liquid crystal to generate a cholesteric liquid crystal capsule;

S2, coating one or more layers of the cholesteric liquid crystal capsule onto a first substrate layer by layer to form a cholesteric liquid crystal layer;

S3, exposing the cholesteric liquid crystal layer to light so that the same layer of cholesteric liquid crystal has different pitches in different regions so as to be capable of reflecting light of different colors; and S4, attaching an electrode substrate opposite to the first substrate onto the cholesteric liquid crystal layer which has been treated in step S3, so as to dispose the cholesteric liquid crystal layer between them to obtain the cholesteric liquid display.

The cholesteric liquid display of an embodiment of the invention enables full color display in a single layer, is of a simple structure, and the method for preparing the same is simple, easy, has low costs, and is suitable for mass production.

BRIEF DESCRIPTION OF THE DRAWINGS

In order to more clearly illustrate the technical solutions of the embodiments, the figures of the embodiments are briefly introduction as follows. Apparently, the figures described hereinafter merely relate to some embodiments of the invention, but do not limit the invention.

DETAILED DESCRIPTION

Figure 1:
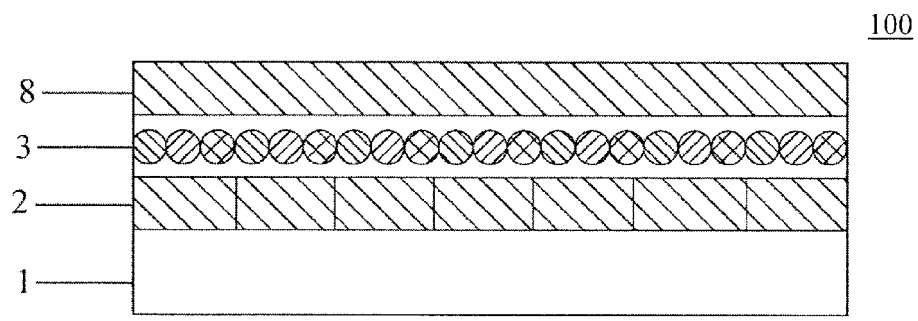
FIG. 1 is a diagram of the structure of a cholesteric liquid display according to an embodiment of the invention.

As shown in FIG. 1, a cholesteric liquid display 100 according to an embodiment of the invention comprises: a flexible substrate 1, an electrode substrate 8 opposite to the flexible substrate 1, and a cholesteric liquid crystal layer 3 disposed between the flexible substrate 1 and the electrode substrate 8. The flexible substrate 1 is an example of the first substrate.

The cholesteric liquid crystal 3 may comprise one or more layers (sub-layers) of cholesteric liquid crystal (in the figure, only the structure of one layer of cholesteric liquid crystal is shown as an example). Each layer of cholesteric liquid crystal can enable full color display in a single layer, that is, the same layer of cholesteric liquid crystal can reflect light of various colors, such as red light, green light and blue light, respectively, for example, the reflected light has wavelength of 630 nm, 532 nm and 448 nm, respectively. Moreover, each layer of cholesteric liquid crystal reflects light of the same wavelength in the region corresponding to the same sub-pixel, or reflects light of the same color in the region corresponding to the same sub-pixel on the flexible substrate 1.

An electrode structure 2 that controls each sub-pixel is formed on the flexible substrate 1, and therefore the flexible substrate 1 is also referred to an array substrate. An example of the electrode structure 2 in of an active control type (such as thin film transistor) or a passive control type.

In an example, the flexible substrate 1 may be replaced with a hard substrate such as glass, quartz and the like.

In an example, the cholesteric liquid crystal layer 3 comprises, for example, two layers of cholesteric liquid crystal.

Figure 2:
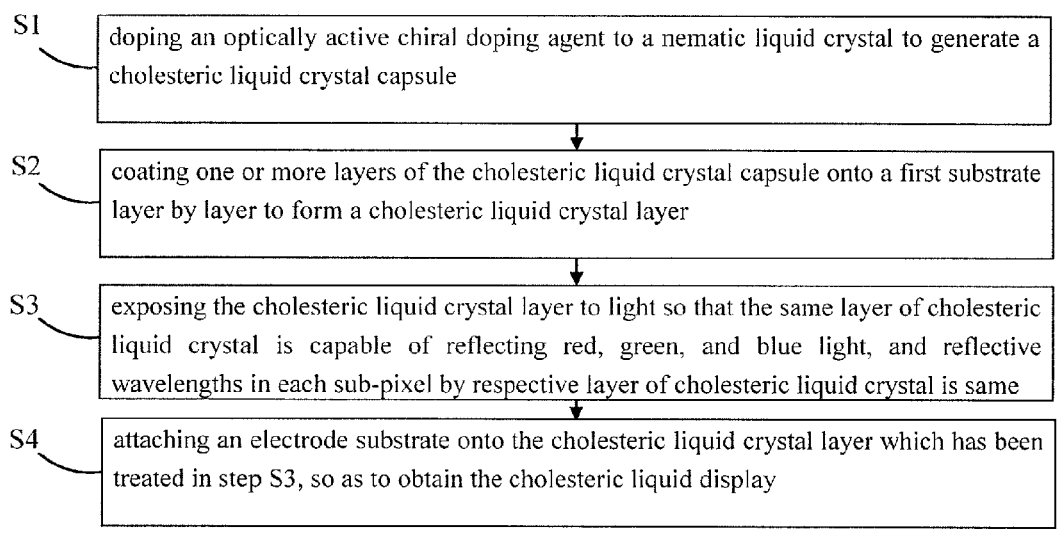
FIG. 2 is a flow chart of a method for preparing a cholesteric liquid display according to an embodiment of the invention; and FIG. 3(a) to FIG. 3(d) is a scheme of preparing a cholesteric liquid display according to an embodiment of the invention.

FIG. 2 shows a method for the preparation of a cholesteric liquid crystal display according to an embodiment of the invention comprising the steps:

S1, doping an optically active chiral doping agent to a nematic liquid crystal to generate a cholesteric liquid crystal capsule.

The nematic liquid crystal may be a commonly used normal nematic liquid crystal with a structural formula of, for example,

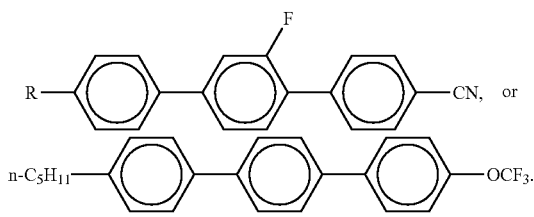

The cholesteric liquid crystal material is formulated from a nematic liquid crystal composition and a chiral doping agent. The chiral agent has a structure containing a chiral C atom, effect of which is to twist the liquid crystal material along a certain direction. An example of the chiral doping agent is:

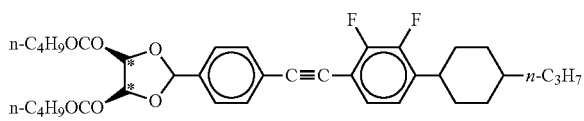

When an optically active chiral doping agent is mixed with the nematic liquid crystal, the optically active chiral doping agent will deposit on the surface of the particles of the nematic liquid crystal. The resulting polymer has a network structure and wraps up the nematic liquid crystal to form an encapsulated structure, so as to form the cholesteric liquid crystal capsule. Alternatively, the particles of the nematic liquid crystal may serve as a nucleating substance to have the optically active chiral doping agent deposited on it by physical adsorption, so as to generate the cholesteric liquid crystal capsule.

For example, the ultraviolet absorption peak of the doping agent is 360 nm, the doping agent accounts for 8% by weight of the nematic liquid crystal, and the reflective wavelength of the generated cholesteric liquid crystal capsule 9 is in the range of 420-700 nm. For example, it is preferred that the generated cholesteric liquid crystal capsule 9 has a reflective wavelength of 450 nm.

S2, coating one or more layers of the cholesteric liquid crystal capsule 9 onto the flexible substrate 1 layer by layer to form a cholesteric liquid crystal layer 3.

Figure 3:
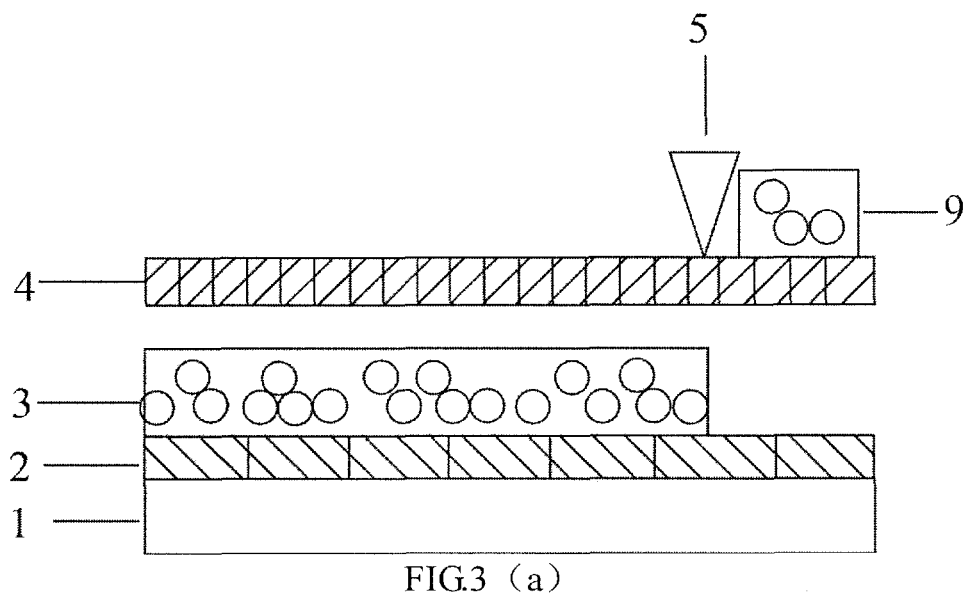
Figure 3:
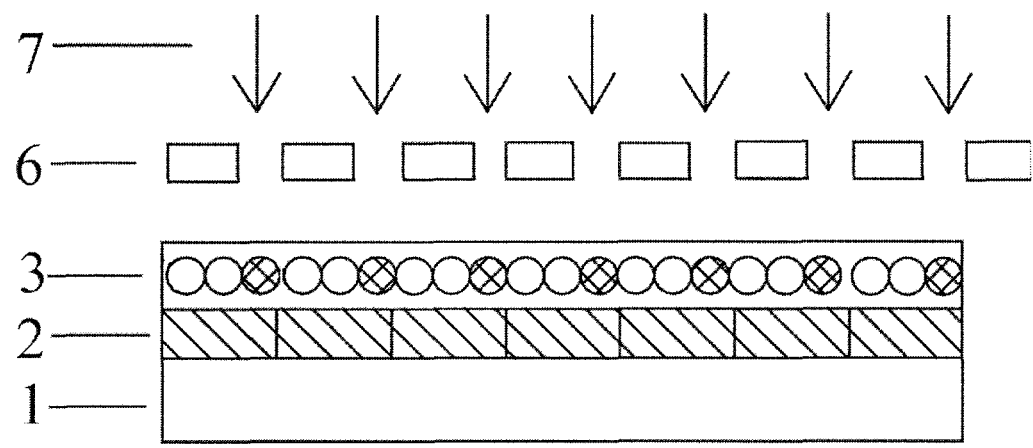
Figure 3:
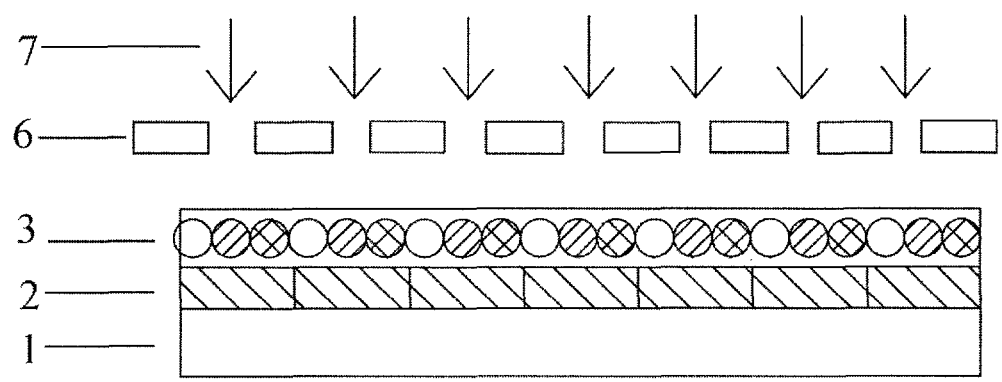
Figure 3:
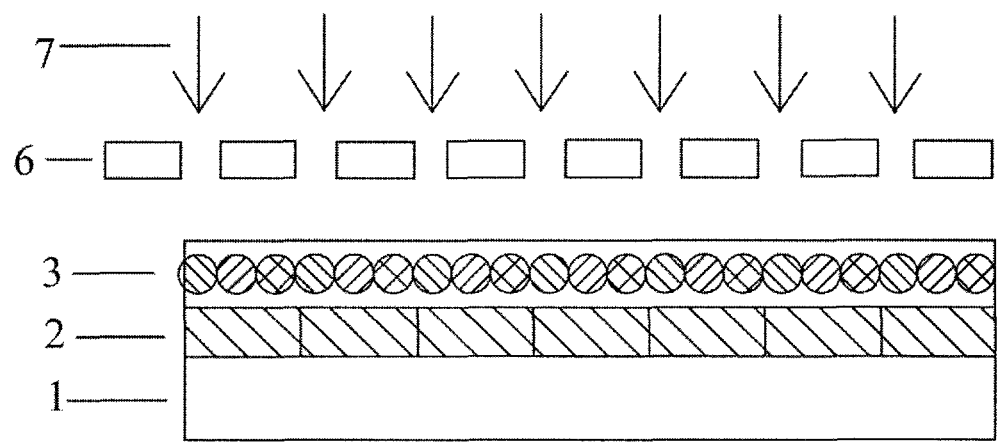

For example, as shown in FIG. 3 (a) (only the occasion of single layered cholesteric liquid crystal is used as an example), the cholesteric liquid crystal capsule 9 is scraped through a screen 4 onto the flexible substrate 1 layer by layer with a scraper 5 to form the cholesteric liquid crystal layer 3. An electrode structure 2 that controls each sub-pixel is formed on the flexible substrate 1, that is, the flexible substrate acts as an array substrate. The electrode structure 2 is, for example, of active control type or passive control type. In an example, the flexible substrate 1 may be replaced with a hard substrate such as glass, quartz and the like.

Here, the thickness of each of the resultant layers of the liquid crystal is correlated with the thickness of the silk screen. The desired thickness of the cholesteric liquid crystal may be 3-10 μm. If the thickness of the silk screen is 3 μm, 1-4 times of scrape may be enough for the desired thickness. That is, the silk screen and the times of scrape are chosen according to the desired thickness of the liquid crystal layer.

S3, exposing the cholesteric liquid crystal layer 3 to light so that the same layer of cholesteric liquid crystal has different pitches in different regions (such as sub-pixel regions) so as to be capable of reflecting light of different colors, for example, red light, green light and blue light, and the portion of each layer of cholesteric liquid crystal that is in a corresponding region to a same sub-pixel region on the flexible substrate 1 has the same reflective wavelength.

The corresponding wave length of the UV exposure is selected according to the UV absorption peak of the doping agent. The exposure duration is, for example, less than 30 minutes. For example, exemplary exposure duration is 0.5-10 minutes.

FIG. 3(*b*)-FIG. 3(*d*) (only showing the occasion of single layered cholesteric liquid crystal) show an example of how step S3 is conducted. In this example, the single layered cholesteric liquid crystal is subjected to exposure so as to reflect red, green and blue light in different regions. Detailed illustration is as follows.

First, FIG. 3(*b*) shows a step of irradiating the first sub-pixel region with UV light 7 of 250 mJ through the shadow mask 6, such that the cholesteric liquid crystal corresponding to the first sub-pixel (as indicated by the shadowed circles in the figure) is capable of reflecting red light after the exposure;

Second, FIG. 3(*d*) shows a step of irradiating the second sub-pixel region with UV light 7 of 135 mJ through the shadow mask 6, such that the cholesteric liquid crystal corresponding to the second sub-pixel (as indicated by the slashed circles in the figure) is capable of reflecting green light after the exposure; and Finally, FIG. 3(*e*) shows a step of irradiating the third sub-pixel region with UV light 7 of 100 mJ through the shadow mask 6, such that the cholesteric liquid crystal corresponding to the third sub-pixel (as indicated by the back-slashed circles in the figure) is capable of reflecting blue light after the exposure.

The aforementioned first, second and third sub-pixel regions are adjacent to one another and share the same structure. In another example, where the first, second and third sub-pixel regions have different structures (for example, have different areas), different shadow masks are employed to expose the first, second and third sub-pixel regions, respectively.

S4, attaching an electrode substrate 8 opposite to the first substrate onto the cholesteric liquid crystal layer 3 which has been treated in step S3, resulting in the cholesteric liquid display as shown in FIG. 1.

In an example, the cholesteric liquid crystal layer 3 comprises, for example, two layers of cholesteric liquid crystal. These two layers of cholesteric liquid crystals may be exposed individually after being coated, or may be exposed in a same exposure step.

In the method of an embodiment of the invention, a cholesteric liquid crystal capsule is prepared by the doping of an optically active chiral agent into a nematic liquid crystal and through a process of coagulation and encapsulation; for example, the cholesteric liquid crystal capsule is scraped by a scraper through a screen onto a flexible substrate, then different sub-pixel regions are subjected to irradiation by UV light of different energy, and a cholesteric liquid crystal with a specific pitch is prepared according to the different energy of irradiation on the sub-pixel region; the wavelength of the reflected light is controlled through the pitch of the cholesteric liquid crystal, such that a cholesteric liquid display is prepared such that the cholesteric liquid crystals corresponding to various sub-pixel reflects reflect various colored light such as red, green, blue and the like. Compared to a display that stacks cholesteric liquid crystal layers respectively reflecting red, green and blue light, this method has the effect of reduced cost and increased transmissivity.

The aforementioned embodiments are for illustrating, but not limiting the invention. A person of ordinary skill in the art may make various changes and variations without departing from the sprit and scope of the invention. Therefore any equivalent technical solution also falls into the scope of the invention. The scope of protection of the invention shall be limited by the claims.

The invention claimed is:

1. A cholesteric liquid display, comprising:
a first substrate;
an electrode substrate opposite to the first substrate; and
a cholesteric liquid crystal layer between the first substrate and the electrode substrate,
wherein the cholesteric liquid crystal layer comprises at least one layer of cholesteric liquid crystal, the same layer of cholesteric liquid crystal has different pitches in different regions so as to be capable of reflecting light of different colors, and the cholesteric liquid crystal is a cholesteric liquid crystal capsule formed by doping an optically active chiral doping agent to a nematic liquid crystal,
wherein the cholesteric liquid crystal capsule has a particle of the nematic liquid crystal as a nucleating substance with the optically active chiral doping agent deposited on the particle, wherein the optically active chiral doping agent has a formula of

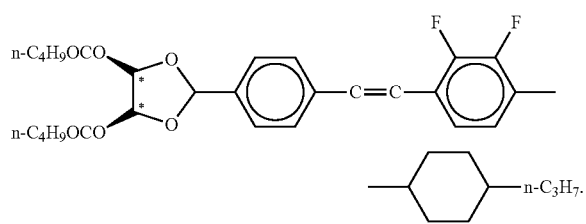

2. The cholesteric liquid display according to claim 1, wherein the light of different colors comprises red light, green light and blue light.

3. The cholesteric liquid display according to claim 1, wherein the cholesteric liquid crystal layer comprises at least two layers of cholesteric liquid crystals.

4. The cholesteric liquid display according to claim 1, wherein the first substrate is a flexible substrate.

5. A method for preparing a cholesteric liquid display comprising steps of:
S1, doping an optically active chiral doping agent to a nematic liquid crystal to generate a cholesteric liquid crystal capsule,
wherein the cholesteric liquid crystal capsule is formed by the following way: the optically active chiral doping agent is mixed with the nematic liquid crystal, the optically active chiral doping agent deposits on the surface of the particles of the nematic liquid crystal, the resulting polymer has a network structure and wraps up the nematic liquid crystal to form an encapsulated structure, so as to form the cholesteric liquid crystal capsule; or
wherein the cholesteric liquid crystal capsule is formed by the following way: the particles of the nematic liquid crystal serve as a nucleating substance to have the optically active chiral doping agent deposited on it by physical adsorption, so as to generate the cholesteric liquid crystal capsule;
S2, coating one or more layers of the cholesteric liquid crystal capsule onto a first substrate layer by layer to form a cholesteric liquid crystal layer;
S3, exposing the cholesteric liquid crystal layer to light so that the same layer of cholesteric liquid crystal has different pitches in different regions so as to be capable of reflecting light of different colors; and
S4, attaching an electrode substrate opposite to the first substrate onto the cholesteric liquid crystal layer which has been treated in step S3, so as to dispose the cholesteric liquid crystal layer between them to obtain the cholesteric liquid display.

6. The method for preparing cholesteric liquid display according to claim 5, wherein an ultraviolet absorption peak of the doping agent is 360 nm, the doping agent accounts for 8% by weight of the nematic liquid crystal, and the reflective wavelength of the cholesteric liquid crystal capsule is in the range of 420-700 nm.

7. The method for preparing cholesteric liquid display according to claim 6, wherein the cholesteric liquid crystal capsule has a reflective wavelength of 450 nm.

8. The method for preparing cholesteric liquid display according to claim 5, wherein in the step S2, the cholesteric liquid crystal capsule is scraped onto the first substrate layer by layer with a scraper through a screen.

9. The method for preparing cholesteric liquid display according to claim 5, wherein the light of different colors includes red light, green light and blue light.

10. The method for preparing cholesteric liquid display according to claim 5, wherein the step S3 further comprises:
irradiating the cholesteric liquid crystal corresponding to a first sub-pixel region with UV light of a first set energy through a shadow mask, such that the cholesteric liquid crystal corresponding to the first sub-pixel is capable of reflecting red light;
irradiating the cholesteric liquid crystal corresponding to a second sub-pixel region with UV light of a second set energy through a shadow mask, such that the cholesteric liquid crystal corresponding to the second sub-pixel is capable of reflecting green light; and
irradiating the cholesteric liquid crystal corresponding to a third sub-pixel region with UV light of a third set energy through a shadow mask, such that the cholesteric liquid crystal corresponding to the third sub-pixel is capable of reflecting green light.

11. The method for preparing cholesteric liquid display according to claim 10, wherein the first set energy is 250 mJ, the second set energy is 135 mJ, and the third set energy is 100 mJ.

12. The method for preparing cholesteric liquid display according to claim 5, wherein in the step S3, exposure duration is less than 30 minutes.

13. The method for preparing cholesteric liquid display according to claim 12, wherein in the step S3, the exposure duration is 0.5-10 minutes.

14. The method for preparing cholesteric liquid display according to claim 5, wherein the first substrate is a flexible substrate.

15. The method for preparing cholesteric liquid display according to claim 5, wherein the cholesteric liquid crystal layer comprises at least two layers of cholesteric liquid crystals.

16. The cholesteric liquid display according to claim 1, wherein electrode structures each configured for controlling a sub-pixel are provided on the first substrate, and the cholesteric liquid crystal layer is interposed between the electrode structures and the electrode substrate.

17. The cholesteric liquid display according to claim 4, wherein electrode structures each configured for controlling a sub-pixel are provided on the first substrate, and the cholesteric liquid crystal layer is interposed between the electrode structures and the electrode substrate.

18. The method for preparing cholesteric liquid display according to claim 5, wherein electrode structures each configured for controlling a sub-pixel are provided on the first substrate, and the cholesteric liquid crystal layer is interposed between the electrode structures and the electrode substrate.

19. The method for preparing cholesteric liquid display according to claim 14, wherein electrode structures each configured for controlling a sub-pixel are provided on the first substrate, and the cholesteric liquid crystal layer is interposed between the electrode structures and the electrode substrate.

\* \* \* \* \*